(12) United States Patent
Trujillo

(10) Patent No.: US 6,941,859 B2
(45) Date of Patent: Sep. 13, 2005

(54) NUT HULLING TUB AGITATING FINGERS

(76) Inventor: George Trujillo, 803 W. Lark CT, Visalia, CA (US) 93291

( * ) Notice: Subject to any disclaimer, the term of this patent is extended or adjusted under 35 U.S.C. 154(b) by 0 days.

(21) Appl. No.: 10/424,241

(22) Filed: Apr. 27, 2003

(65) Prior Publication Data
US 2003/0233948 A1 Dec. 25, 2003

Related U.S. Application Data
(60) Provisional application No. 60/390,407, filed on Jun. 24, 2002.

(51) Int. Cl.[7] .............................. A23N 7/00; A23N 7/02
(52) U.S. Cl. .............................. 99/574; 99/568; 99/523; 99/529; 99/530
(58) Field of Search .......................... 99/516, 518, 487, 99/536, 519, 568–581, 623–630; 426/481–483; 366/219, 224–231

(56) References Cited

U.S. PATENT DOCUMENTS

| 2,633,884 A | * | 4/1953 | Carlstedt ...................... 99/630 |
| 2,757,695 A | * | 8/1956 | Valdes .......................... 99/575 |
| 3,134,414 A | * | 5/1964 | Winroth ........................ 99/632 |
| 3,186,457 A | * | 6/1965 | Dames .......................... 99/591 |
| 3,628,582 A | * | 12/1971 | Satake .......................... 99/617 |
| 3,648,745 A | * | 3/1972 | Stamatiou ..................... 99/519 |
| 3,762,308 A | * | 10/1973 | Greene et al. ................ 99/632 |
| 4,144,805 A | * | 3/1979 | Cacho .......................... 99/568 |
| 4,442,764 A | * | 4/1984 | Bos et al. ..................... 99/633 |
| 5,245,919 A | * | 9/1993 | Neidigh ........................ 99/623 |
| 5,858,429 A | * | 1/1999 | Wallace ....................... 426/231 |
| 5,950,529 A | * | 9/1999 | Molloy ......................... 99/633 |
| 6,422,137 B1 | * | 7/2002 | Nakhei-Nejad ............... 99/621 |

* cited by examiner

Primary Examiner—Timothy F. Simone
(74) Attorney, Agent, or Firm—Donald W. Meeker

(57) ABSTRACT

An agitating device is provided that may be mounted inside a rotating nut hulling tub for increasing the agitation of the nuts, thereby increasing the hulling speed, especially important for pistachio nuts. The device comprises a bracket capable of being attached to the inside cover of a rotatable nut hulling tub, which has side wall protrusions for hulling nuts. There are at least four brackets attached to the cover at cardinal points. Each bracket has a series of three holes and three tub fingers. The tub fingers are capable of being attached to the bracket so the fingers hang downwardly into the tub in contact with the nuts, thereby agitating the nuts as they move inside the rotatable tub. The tub fingers are capable of assisting in knocking off the nut hulls and causing the nuts to move against the side wall protrusions at a faster rate, thereby speeding up the nut hulling process.

4 Claims, 2 Drawing Sheets

NUT HULLING TUB AGITATING FINGERS

CLAIM OF PROVISIONAL APPLICATION RIGHTS

This application claims the benefit of U.S. Provisional Patent Application No. 60/390,407, filed on Jun. 24, 2002.

BACKGROUND OF THE INVENTION

1. Field of the Invention

The present invention relates to nut hulling apparatus and in particular to cover mounted agitating fingers for a rotating tub for removing the hulls of nuts.

2. Description of the Prior Art

A normal tube pistachio peeler resembles the inside of a washer, only the tub is much bigger. That is, the tub is round in shape and spins clockwise. Furthermore, the walls of the tub are lined with angled strips of metal that knock the hulls off the pistachios. Before the pistachios ate fed into the tub, they are stored in the stainless steel container located at the top of tub. Once the pistachios are fed into the tub, they are spun around until the hulls are knocked off by the grid lining the tub walls. The process usually takes about 95 seconds.

Pistachio nuts have a hard shell around the edible kernel and a pericarp or hull which encases the shell. The hulling of pistachios is difficult and presents some unusual problems. The hulls of pistachios are stronger, more tenaciously adherent to the shells, and more difficult to remove than the hulls of many nuts, particularly if the pistachio is not yet ripe. If the hull is not promptly removed from pistachios after harvest, it discolors the shells requiring that the normally attractive straw colored shells be colored to hide undesirable stains. For this reason, most commercial pistachios are dyed an unnatural and undesirable pink or red color to obscure the stains. Even when abundant hand labor is available, it is usually not feasible to hull sufficiently large volumes of pistachios soon enough after harvest to avoid shell discoloration. As a result, mechanical hullers of various configurations have been developed.

Prior art U.S. Pat. No. 4,144,805, issued Mar. 20, 1979 to Cacho, provides a nut huller and/or sheller comprising, in combination, a container with its long axis vertical, a rotatable shaft concentrically mounted within said container, a plurality of radially extending blades mounted on said shaft to form a rotor assembly. The blades being divided into an upper group attached to an upper portion of said shaft in a helix of one direction and a lower group attached to a lower portion of said shaft in a helix of the opposite direction, a means for journaling said shaft in said container, and a means for rotating said rotor assembly.

Prior art U.S. patent application Ser. No. 20020166464, issued Nov. 14, 2002 to Warmack, shows a nutcracker apparatus that will successfully and efficiency crack nuts and separate the meat from the shell. To enable successful cracking the present invention comprises a housing having an inlet and outlet. Interiorly located in the housing is a rotatable horizontally disposed drum. A shaft having a plurality of paddles extends centrally through the drum. Secured to the wall of the drum is a plurality of removable screens. Nuts are feed to the inlet into the rotatable drum. During rotation, the paddles impart a force on the nuts causing them to crack and having the shells dislodge from the meat. The screens enable the appropriately sized meat to fall therethrough.

Prior art U.S. Pat. No. 4,034,665, issued Jul. 12, 1977 to McFarland, claims a pistachio huller having two stages; a first stage including a pair of rollers between which the pistachios are passed to rupture the pericarps thereof to form tag ends of pericarps adherent to the shells of the pistachios and a second stage including a plurality of parallel fine rollers closely spaced to preclude the passage of pistachios therebetween with the adjacent fine rollers alternately and oppositely oscillated to strip the tag ends of pericarps from the pistachios.

Prior art U.S. Pat. No. 6,422,137, issued Jul. 23, 2002 to Nakhei-Nejad, describes an apparatus for separating hulled and unhulled pistachios includes a rotating roller and a conveyor for depositing pistachios onto the roller. Rotation of the drum frictionally separates hulled and unhulled pistachios.

Prior art U.S. Pat. No. 6,009,799, issued Jan. 4, 2000 to Lemos, discloses a system for splitting pistachios including an adjustable splitter assembly including plungers driven by cams. The cams are frictionally slidable on a rotating camshaft to allow snubbing of the plungers against the nuts. Cavities on the splitter jaw and plungers include relief holes to avoid crushing of the ends of the nuts and encourage an appropriate split. Cushions between the plungers and cam followers reduce impact on the pistachios.

Prior art U.S. Pat. No. 5,711,212, issued Jan. 27, 1998 to Lemos, indicates a process for splitting pistachios including a bin dumper, a sizer, moisturizers, blowers and splitting units arranged in seriatim. The blower removes excess water and particles from the nut surfaces after moisturizing and before splitting. The splitter includes a controlled surge bin having a brush gate associated with a sensor to control flow to a singulator. A vibrated singulator operates to release nuts to a splitting mechanism having opposed elements with cavities aligned to receive the ends of the nuts. Cradles retain the nuts in alignment for compression. Lateral vibration is induced in the cradles to ensure placement of the retained nuts.

Prior art U.S. Pat. No. 5,511,470, issued Apr. 30, 1996 to Lemos, puts forth a process for splitting pistachios including a bin dumper, a sizer, moisturizers, blowers and splitting units arranged in seriatim. The blower removes excess water and particles from the nut surfaces after moisturizing and before splitting. The splitter includes a controlled surge bin having a brush gate associated with a sensor to control flow to a singulator. A vibrated singulator operates to release nuts to a splitting mechanism having opposed elements with cavities aligned to receive the ends of the nuts. Cradles retain the nuts in alignment for compression. Lateral vibration is induced in the cradles to ensure placement of the retained nuts.

Prior art U.S. Pat. No. 5,245,918, issued Sep. 21, 1993 to Volk, Sr., concerns a pistachio huller provided wherein a means having projections pushes unhulled nuts between the surface of the means having projections and a surface of a means having channels, the channels being wider than the pistachio nuts to be hulled. The projections protrude into the channels and the hulls are ruptured and abraded through contact between the surface of the means with projections and the surface of the channels whereby the nuts are hulled.

Prior art U.S. Pat. No. 5,076,158, issued Dec. 31, 1991 to Tippett, illustrates an apparatus wherein a platform mounts an electric drive for selective use and cooperation with a manual crank to rotate a drum supporting shaft to rotate a drum in cooperation with a chute, wherein the chute includes a convex grinding surface to receive members therethrough to grind such members in cooperation with a multi-lobed drum. The drum lobes are optionally provided for selective replacement utilizing lobes of a multi-ribbed construction in cooperation with an initial and primary shell cracking rib.

Prior art U.S. Pat. No. 2,757,695, issued Aug. 7, 1956 to Valdes, depicts a machine for shelling edible nuts. The machine includes a cylinder adapted for rotation with a body of cracked nuts tumbled about therein and which is provided with a multiplicity of annular members which are spaced apart to provide spaces therebetween through which nut meats and shell fragments pass the predominant objects of the invention being to provide such a machine which includes means whereby the widths of the spaces between said adjacent pairs of said annular members may be regulated from the exterior of the machine when the machine is at rest or is in operation.

Prior art U.S. Pat. No. 4,448,115, issued May 15, 1984 to Volk, Sr., shows a pistachio huller is provided wherein a means having projections pushes unhulled nuts between the surface of the means having projections and a surface of a means having slots, the slots being narrower than the pistachio nuts to be hulled. The projections protrude into the slots and the hulls are ruptured and abraded through contact between the surface of the means with projection and the surface of the strips forming the means having slots whereby the nuts are hulled.

Prior art U.S. Pat. No. 4,353,931, issued Oct. 12, 1982 to Volk, Sr., claims a pistachio huller is provided wherein a means having projections pushes unhulled nuts between the surface of the means having projections and a surface of a means having slots, the slots being narrower than the pistachio nuts to be hulled. The projections protrude into the slots and the hulls are ruptured and abraded through contact between the surface of the means with projection and the surface of the strips forming the means having slots whereby the nuts are hulled.

Prior art U.S. Pat. No. 5,329,845, issued Jul. 19, 1994 to Bichel, describes an apparatus that comprises a cage (rotatable in one direction) formed by roller brushes (rotatable in the opposite direction) radially arranged about a axis to define a sloped chamber. A fender is located along one side of each roller brush. A stationary tube, closed at both ends and having a motor-driven rotatable auger therein, extends through the chamber. The tube has four openings (proceeding from the high to the low end of the chamber): a top (supply) opening; a bottom (feed) opening; a top (recovery) opening; and a bottom (discharge) opening. Unhulled nuts from the supply opening are fed through the feed opening by the auger and form a single layer against the chamber wall and advance through the sloped chamber. During cage and roller rotation, each nut is trapped between a fender and the bristles in the outgoing quadrant of the adjacent roller brush and the hull is removed. Fully-hulled nuts, when they reach the 3 o'clock to 1:30 o'clock position of the rotating cage, fall through the recovery opening into the tub and are expelled from the tube through the discharge opening by the auger.

Prior art U.S. Pat. No. 4,996,917, issued Mar. 5, 1991 to Burlock, discloses an apparatus for splitting closed pistachio nuts in a controlled manner such that the longitudinal sutures of the nuts will be cracked open. The apparatus includes a cylindrical housing with a mandrel mounted for rotation therein to provide an annulus into which nuts can be introduced. According to various features of the apparatus, the pistachio nuts are rotated, oriented and then split along their sutures in the annulus and subsequently discharged through an opening in the housing. There is also provided a continuous process of treating closed shell pistachio nuts which includes the step of removing the denser foreign particles from the closed shell nuts by flotation; and a soaking step so that the shells of the unopened pistachio nuts will be saturated with water to provide a degree of shell flexibility such that when pressure is applied to the suture of the shell to effect splitting, the shell will flex rather than crack. The shells are subsequently surface dried and then introduced to a splitting operation of the type carried out by the apparatus previously described.

Prior art U.S. Pat. No. 4,980,188, issued Dec. 25, 1990 to Burlock, indicates an apparatus for splitting closed pistachio nuts in a controlled manner such that the longitudinal sutures of the nuts will be cracked open. The apparatus includes a cylindrical housing with a mandrel mounted for rotation therein to provide an annulus into which nuts can be introduced. According to various features of the apparatus, the pistachio nuts are rotated, oriented and then split along their sutures in the annulus and subsequently discharged through an opening in the housing. There is also provided a continuous process of treating closed shell pistachio nuts which includes the step of removing the denser foreign particles from the closed shell nuts by flotation; and a soaking step so that the shells of the unopened pistachio nuts will be saturated with water to provide a degree of shell flexibility such that when pressure is applied to the suture of the shell to effect splitting, the shell will flex rather than crack. The shells are subsequently surface dried and then introduced to a splitting operation of the type carried out by the apparatus previously described.

Prior art U.S. Pat. No. 4,961,947, issued Oct. 9, 1990 to Burlock, puts forth an apparatus for splitting closed pistachio nuts in a controlled manner such that the longitudinal sutures of the nuts will be cracked open. The apparatus includes a cylindrical housing with a mandrel mounted for rotation therein to provide an annulus into which nuts can be introduced. According to various features of the apparatus, the pistachio nuts are rotated, oriented and then split along their sutures in the annulus and subsequently discharged through an opening in the housing. There is also provided a continuous process of treating closed shell pistachio nuts which includes the step of removing the denser foreign particles from the closed shell nuts by flotation; and a soaking step so that the shells of the unopened pistachio nuts will be saturated with water to provide a degree of shell flexibility such that when pressure is applied to the suture of the shell to effect splitting, the shell will flex rather than crack. The shells are subsequently surface dried and then introduced to a splitting operation of the type carried out by the apparatus previously described.

Prior art U.S. Pat. No. 4,909,140, issued Mar. 20, 1990 to Burlock, concerns an apparatus for splitting closed pistachio nuts in a controlled manner such that the longitudinal sutures of the nuts will be cracked open. The apparatus includes a cylindrical housing with a mandrel mounted for rotation therein to provide an annulus into which nuts can be introduced. According to various features of the apparatus, the pistachio nuts are rotated, oriented and then split along their sutures in the annulus and subsequently discharged through an opening in the housing. There is also provided a continuous process of treating closed shell pistachio nuts which includes the step of removing the denser foreign particles from the closed shell nuts by flotation; and a soaking step so that the shells of the unopened pistachio nuts will be saturated with water to provide a degree of shell flexibility such that when pressure is applied to the suture of the shell to effect splitting, the shell will flex rather than crack. The shells are subsequently surface dried and then introduced to a splitting operation of the type carried out by the apparatus previously described.

Prior art U.S. Pat. No. 4,773,323 issued Sep. 27, 1988 to Frasch, illustrates a process for shelling nuts, particularly pistachio nuts, includes the step of slowly and continuously compressing the nuts in the longitudinal direction and not increasing the compression at the moment when the shells break. This compression can preferably be effected in the longitudinal direction with the aid of two rotating disks arranged to be slightly inclined relative to each other.

Prior art U.S. Pat. No. 4,183,967, issued Jan. 15, 1980 to Nelson, is for a process for splitting the shells of pistachio nuts comprising soaking closed-shell pistachio nuts in an aqueous liquid, subjecting the wet-shelled nuts to mechanical pressure to compress them, releasing the said pressure, and substantially immediately subjecting the nuts having the mechanically compressed shells to an elevated temperature to effect splitting of at least the majority of the shells.

Prior art U.S. Pat. No. 2,302,227, issued Nov. 17, 1942 to Kasser, claims a method for cracking and shelling nuts which includes the steps of applying forces to accelerate the advancement of the nuts through a cracking space, relieving pressure immediately after cracking is completed, and removing loose shell pieces even before sifting or complete separation or further treatment of the meat and shell.

Prior art U.S. Pat. No. 1,194,318, issued Aug. 8, 1916 to Power, shows an improved nutcracker in which the nut meats may be separated from the shells with a minimum of crushing, producing large quantities in a relatively short period of time.

What is needed is a simple inexpensive yet effective means to assist in speeding up the time it takes to hull pistachio nuts.

SUMMARY OF THE INVENTION

An object of the present invention is to provide an agitating device to be mounted inside a rotating nut hulling tub for increasing the agitation of the nuts, thereby increasing the hulling speed, especially important in removing pistachio hulls.

Another object of the present invention is to provide a bracket capable of being attached to the inside cover of a rotatable nut hulling tub that is easy to install.

One more object of the present invention is to provide an agitating device that may be easily used to retrofit existing equipment, thereby adding profit for existing nuthull removing systems.

An additional object of the present invention is to provide tub fingers that comprise elongated flexible rods capable of agitating the quantity of nuts, which are easily replaced when worn, keeping maintenance costs down.

A further object of the present invention is to provide an agitating device that simple and economical to manufacture.

Yet another object of the present invention is to provide an agitating device that will knock more hulls off, thereby reducing the amount of nuts that need to be reprocessed.

In brief, an agitating device is provided that can be mounted inside a rotating nut hulling tub for increasing the agitation of the nuts, thereby increasing the hulling speed. On the walls of the drum are rough surfaces that separate the hulls from the nuts. The bottom of the drum turns to cause the nuts to rub up against the side wall and remove the hulls. The device comprises a bracket with added tub fingers that is mounted to the cover of a nut hulling drum. The tub fingers hang in a downward position, further stirring up the nuts thereby reducing the time needed to hull the nuts. With the addition of the tub fingers, the nuts are not only knocked off the wall of the drum, they are also constantly being thrown into the tub fingers causing the hulls to be knocked off at a faster rate, thus saving time and amount of re-peels that need to be reprocessed.

An advantage of the present invention is that it speeds up the nut hulling process.

Another advantage of the present invention is that it is easy to install.

An additional advantage of the present invention is that it may be used to retrofit existing equipment.

One more advantage of the present invention is in being economical to manufacture.

A further advantage of the present invention is that the tub fingers may be easily replaced.

A final advantage of the present invention is that there are fewer nuts that need to be reprocessed.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
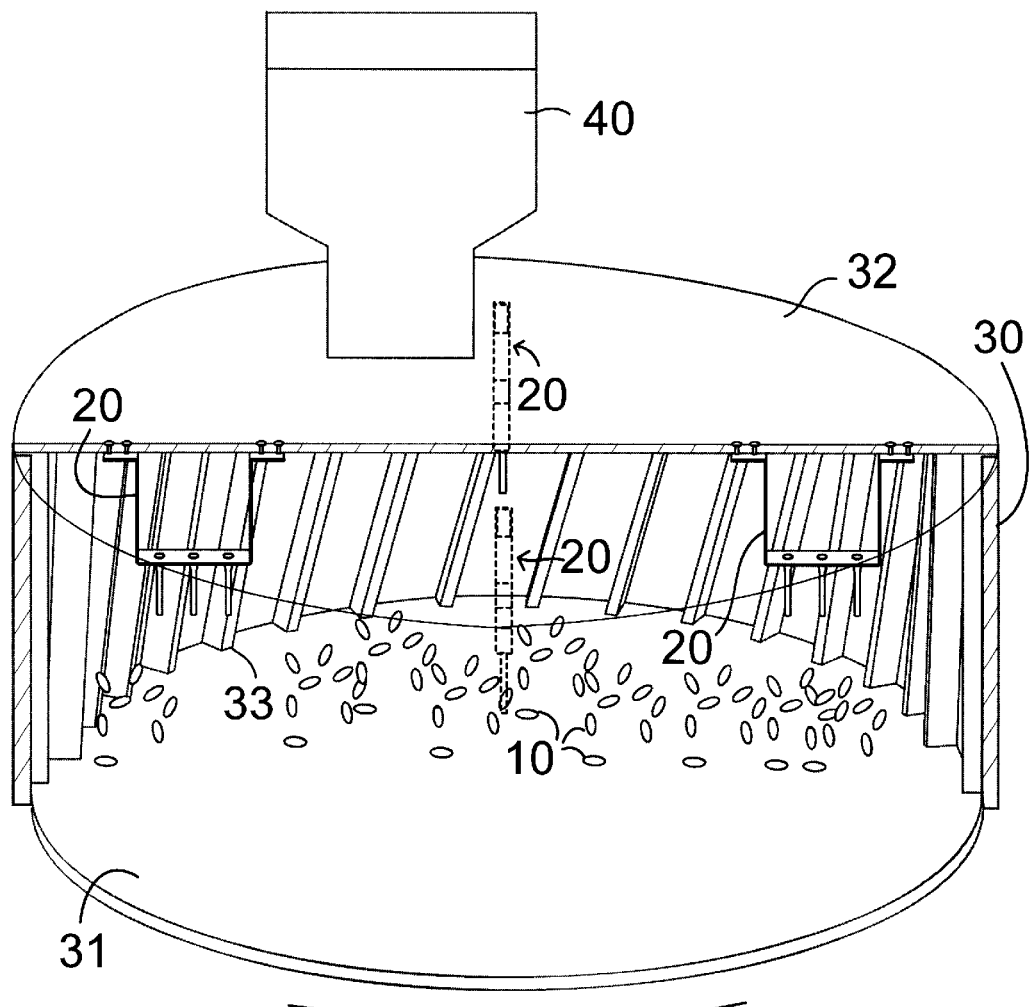
FIG. 1 is a perspective view in partial section of the nut hulling tub showing the tub fingers of the invention mounted on the cover of the tub.
Figure 2:
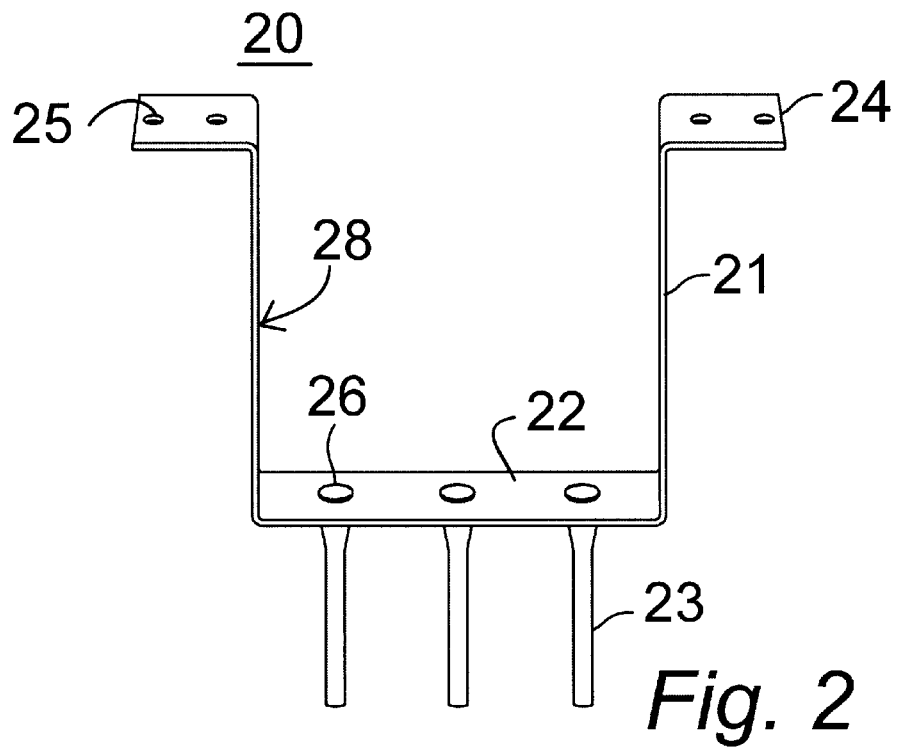
FIG. 2 is a perspective view showing the tub fingers of the present invention attached to the mounting bracket.
Figure 3:
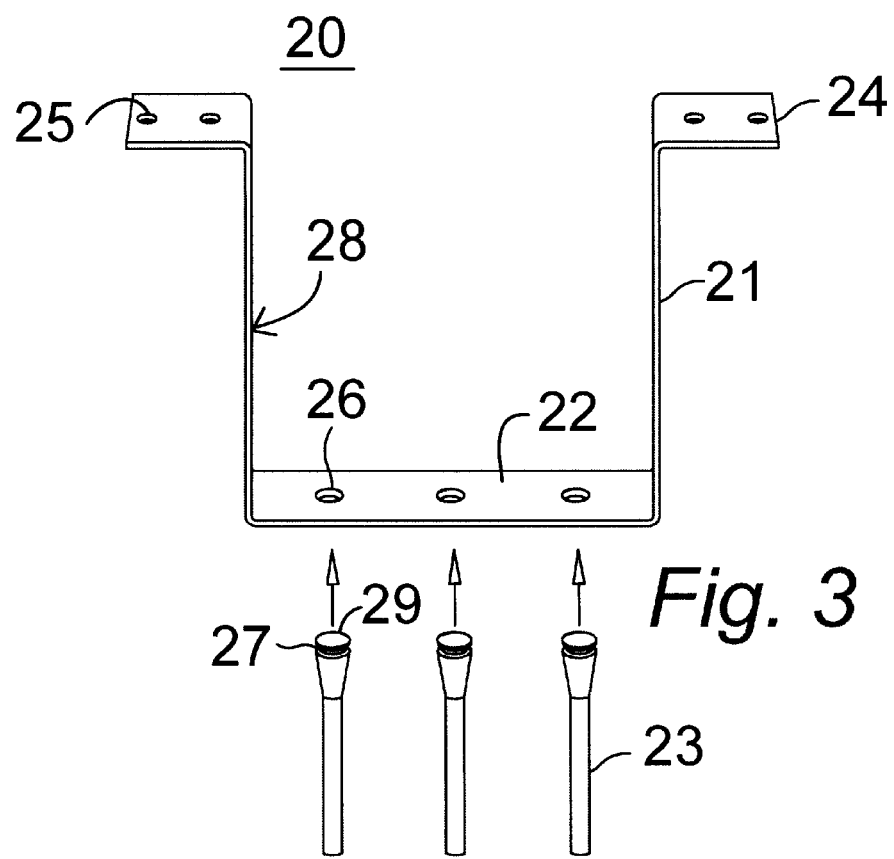
FIG. 3 is a perspective view showing the tub fingers of the present invention aligned to be attached to the mounting bracket.

In FIGS. 1–3, an agitating device 20 is provided that may be mounted inside a rotating nut hulling tub 30 for increasing the agitation of the nuts 10 to increase the hulling speed. The device 20 comprises a bracket 28 that is capable of being attached to the inside of a cover 32 of a rotatable nut hulling tub 30, which has side wall protrusions 33 for hulling nuts 10. The bracket 28 has a mounting plate 22 positioned a sufficient distance below the cover 32 to be in contact with a quantity of nuts 10 placed in the tub 30. The bracket 28 is an elongated rectangular U-shaped bracket 28 that has two long parallel arms 21 and a perpendicular 22 cross piece. Each of the arms 21 has a perpendicular tab 24 which has holes 25 for attaching the bracket 28 to the cover 32 of the tub 30 by a screwing means and a series of holes 26 along the cross piece 22 for receiving the series of tub fingers 23 therein.

The agitating device 20 also comprises a series of tub fingers 23 that are capable of being attached to the mounting plate 22 so that the fingers 23 hang downwardly into the tub 30, thereby making contact with the quantity of nuts 10. The tub fingers 23 comprise elongated flexible rods capable of agitating the quantity of nuts 10. As the nuts 10 are moving inside the rotatable tub 30 they contact the tub fingers 23. The tub fingers 23 are capable of assisting in knocking off the nut hulls and assisting in causing the nuts 10 to move against the side wall protrusions 33 at a faster rate than without the tub fingers 23, thereby speeding up the nut hulling process. The tub fingers 23 each comprise a hard rubber rod that has an outwardly flared top end larger in diameter than each of the series of holes 26 with a circular groove 27 around the perimeter of the rubber rod adjacent to the end of the rubber rod. The diameter of the rod inside the circular groove 27 is equal to the diameter of each of the series of holes 26 so that each of the rubber rods is capable of being force fit into each of the series of holes 26. The top end 29 of each of the tub fingers 23 snap fits into each of the series of holes 26 with each of the grooves 27 engaging the perpendicular cross piece 22, shown in FIG. 2. Each of the brackets 28 preferably has a series of three holes 26 and three tub fingers 23 that are attached to each bracket 28. There are preferably at least four brackets 28 attached to the cover 32 at cardinal points.

In practice, a user would mount at least four brackets 28 to the cover 32 of the inside a rotating nut hulling tub 30 (shown in FIG. 1) for increasing the agitation of the nuts 10 thereby increasing the hulling speed. The brackets 28 would be mounted to the cover 32 by inserting a screwing means through the mounting holes 25 in the perpendicular tab 24 located at the end of each of the arms 21. The user would then press the top ends 29 of the tub fingers 23 into the holes 26 of the perpendicular cross piece 22 until the tub fingers 23 snap fit into each of the series of holes 26 with each of the grooves 27 engaging the perpendicular cross piece 22, as shown in FIG. 2. The user would then replace the cover 32 on the tub 30 and release nuts 10 from the stainless steel storage container 40 into the tub 30. When the tub 30 is activated, the floor 31 of the tub 30 rotates causing the nuts 10 move inside the rotatable tub 30, shown in FIG. 1. The nuts 10 then contact the rough angled surfaces 33 and the tub fingers 23. The tub fingers 23 are capable of assisting in knocking off the nut hulls and assisting in causing the nuts 10 to move against the side wall protrusions 33 at a faster rate than without the tub fingers 23, thereby speeding up the nut 10 hulling process.

It is understood that the preceding description is given merely by way of illustration and not in limitation of the invention and that various modifications may be made thereto without departing from the spirit of the invention as claimed.

What is claimed is:

1. An agitating device to be mounted inside a rotating nut hulling tub for increasing the agitation of the nuts to increase the hulling speed, the device comprising:

a bracket capable of being attached to the inside cover of a rotatable nut hulling tub having side wall protrusions for hulling nuts, the bracket having a mounting plate positioned a distance below the cover a sufficient distance to be in contact with a quantity of nuts placed in the tub;

a series of tub fingers capable of being attached to the mounting plate so that the fingers hang downwardly into the tub in contact with the quantity of nuts, the tub fingers comprising elongated flexible rods capable of agitating the quantity of nuts as the nuts moving inside the rotatable tub contact the tub fingers so that the tub fingers are capable of assisting in knocking off the nut hulls and assisting in causing the nuts to move against the side wall protrusions at a faster rate than without the tub fingers thereby speeding up the nut hulling process.

2. The agitating device of claim 1 wherein the bracket comprises an elongated rectangular U-shaped bracket having two long parallel arms and a perpendicular cross piece, each of the arms having a perpendicular tab having holes at the end of each of the arms for attaching the bracket to the cover of the tub by a screwing means and a series of holes along the cross piece for receiving the series of tub fingers therein.

3. The agitating device of claim 2 wherein the tub fingers each comprise a hard rubber rod having an outwardly flared top end larger in diameter than each of the series of holes with a circular groove around the perimeter of the rubber rod adjacent to the end of the rubber rod, a diameter of the rod inside the circular groove being equal to the diameter of each of the series of holes so that each of the rubber rods is capable of being force fit into each of the series of holes so that the top end of each of the tub fingers snap fits into each of the series of holes with each of the grooves engaging the perpendicular cross piece.

4. The agitating device of claim 3 wherein each of the brackets has a series of three holes and three tub fingers are attached to each bracket and there are at least four brackets attached to the cover at cardinal points.

* * * * *